(12) United States Patent
Predtechenskiy et al.

(10) Patent No.: US 12,187,890 B2
(45) Date of Patent: Jan. 7, 2025

(54) COMPOSITION FOR SOLID TIRES AND A NON-MARKING SOLID TIRE

(71) Applicant: MCD Technologies S.a r.l., Leudelange (LU)

(72) Inventors: Mikhail Rudolfovich Predtechenskiy, Novosibirsk (RU); Aleksandr Aleksandrovich Khasin, Moscow (RU); Ruslan Vladimirovich Karpunin, Kol'tsovo (RU); Andrey Yurievich Skuratov, Novosibirsk (RU); Ekaterina Yurievna Gorbunova, Krasnoyarsk (RU); Minlong Xi, Shanghai (CN)

(73) Assignee: MCD Technologies S.a r.l., Leudelange (LU)

( * ) Notice: Subject to any disclaimer, the term of this patent is extended or adjusted under 35 U.S.C. 154(b) by 510 days.

(21) Appl. No.: 17/642,556

(22) PCT Filed: Oct. 2, 2020

(86) PCT No.: PCT/RU2020/050264
§ 371 (c)(1),
(2) Date: Mar. 11, 2022

(87) PCT Pub. No.: WO2021/091426
PCT Pub. Date: Mar. 14, 2021

(65) Prior Publication Data
US 2022/0325080 A1    Oct. 13, 2022

(30) Foreign Application Priority Data
Nov. 5, 2019   (RU) ................................ 2019135659

(51) Int. Cl.
*C08L 7/00*         (2006.01)
*B60C 1/00*         (2006.01)

(52) U.S. Cl.
CPC .................. *C08L 7/00* (2013.01); *B60C 1/00* (2013.01); *B60C 2001/0091* (2013.01)

(58) Field of Classification Search
None
See application file for complete search history.

(56) References Cited

U.S. PATENT DOCUMENTS

| 2002/0004549 A1* | 1/2002 | Custodero | B60C 1/0025 |
| | | | 524/495 |
| 2004/0187996 A1* | 9/2004 | Grah | B60C 7/00 |
| | | | 152/516 |
| 2018/0171115 A1* | 6/2018 | Sagitani | C08L 9/00 |

FOREIGN PATENT DOCUMENTS

| BY | 10739 C1 | 6/2008 |
| CN | 109694507 A | 4/2019 |

(Continued)

OTHER PUBLICATIONS

Liu, D. et al. "Excited state modulation of C70 dimerization in a carbon nanotube under a variable electron acceleration voltage". Micron 2022, 160, 103316, 1-8. (Year: 2022).*

(Continued)

*Primary Examiner* — Richard A. Huhn
(74) *Attorney, Agent, or Firm* — Bardmesser Law Group

(57) ABSTRACT

The invention solves the problem of creating a rubber composition that can be used in a solid tyre of an extremely simple and manufacturable design to provide safe and hygienic operation of the tyre without accumulating a static electric charge and without leaving black marks on a floor surface. An electrically conductive rubber composition for non-marking solid tyres is proposed, which composition comprises (1) a rubber or a mixture of at least two rubbers, (2) oxide fillers and modifiers, (3) organic plasticisers and modifiers, (4) a curing system and (5) carbon nanotubes, wherein the total amount of carbon nanotubes and carbon of (Continued)

other allotropic modifications constitutes from 0.05 to 1.5 wt % relative to the amount of rubber. A non-marking solid tyre made from the electrically conductive rubber composition is also proposed.

20 Claims, 7 Drawing Sheets

(56) References Cited

FOREIGN PATENT DOCUMENTS

| | | |
|---|---|---|
| RU | 2382799 C1 | 2/2010 |
| RU | 2472813 C1 | 1/2013 |
| WO | WO-9906480 A1 * | 2/1999 ........... C08K 5/3415 |

OTHER PUBLICATIONS

Search Report in PCT/RU2020/050264 dated Feb. 11, 2021.
Search Report in EP 20884767, dated Sep. 13, 2023.

* cited by examiner

COMPOSITION FOR SOLID TIRES AND A NON-MARKING SOLID TIRE

CROSS REFERENCE TO RELATED APPLICATIONS

This application is a US National Phase of PCT/RU2020/050264, filed on Oct. 2, 2020, which claims priority to RU 2019135659, filed Nov. 5, 2019.

FIELD OF THE INVENTION

The present invention relates to electrically conductive rubber compositions and non-marking solid tires made from such rubber compositions.

BACKGROUND OF THE RELATED ART

Solid tires are used in moving machines, where pneumatic tires are undesirable or impracticable due to the machine design (for example, in pallet jack wheels) or technical requirements to the mechanism, e.g., a significant load on the wheel (for example, forklifts).

There are a number of international standards applicable to vehicle tires and covering the electrical properties of tires (International Standard ISO 16392:2017 Tires—Electrical Resistance—Test Method for Measuring Electrical Resistance of Tires on a Test Rig, ASTM F 1971-12(2018) Standard Test Method for Electrical Resistance of Tires Under Load On the Test Bench, etc.). These requirements define and provide protection against static electricity due to the dissipation of the static electricity charge, which is continuously accumulating as the tire is operated, and the prevention of accumulation of the charge in the long term. Depending on the application, the tires are classified into two categories: anti-static tires that can safely dissipate the electrical charge if their measured resistance does not exceed $10^{10}$ Ohm, and conductive tires, if their measured resistance does not exceed $10^6$ Ohm.

In some particular cases, the level of electrical resistance in such tires is additionally defined by operating conditions, for example, when the tires are used under potentially explosive conditions in the areas covered by ATEX Products Directive 2014/34/EU and EN 1755—Industrial trucks—safety requirements and verification—Supplementary requirements for operation in potentially explosive atmospheres.

According to EN 1755, the outer material of the rollers and wheels should have a surface resistance of not more than $10^9$ Ohm.

Conventional Art

The necessary electrical conductivity of the tires is provided by adding electrically conductive fillers into the rubber composition, which form a connected electrically conductive network in the composition. The widely accepted solution is to introduce 25 to 60 parts by weight of carbon black per 100 parts by weight of rubber into the rubber composition (further down in the text, 1 parts by weight per 100 parts by weight of rubber will be denoted by the convention phr—Parts Per Hundred Rubber). Adding carbon black to the rubber composition adversely affects a number of important properties of the rubber composition, including elongation at break, tear strength, abrasion resistance, and dynamic characteristics increasing the rolling resistance and, therefore, heat generation during operation. Moreover, high concentrations of carbon black or other carbon allotropes in the tread are not desirable for indoor tires, since during the operation of such tires the floor surface is stained with hard-to-remove black marks. Such contamination is highly undesirable for a number of reasons, with the main one being stringent hygiene requirements, especially in warehouses and industrial areas of food factories or in public places, such as airports and railway stations.

The black marks from the tires can be avoided by adding non-carbon materials, such as silicon oxide, as a filler to the rubber composition of the solid tires. Such non-marking solid tires are also sometimes referred to as "white" or "non-staining", or "non-marking" in the English references. To make sure the tire leaves no black marks, the concentration of carbon materials (carbon black and most other carbon allotropes, except for diamond) in the rubber of the outer tire layer should not be more than 1 wt. % of carbon black or other carbon allotropes, which corresponds to 1.5-2 parts by weight per 100 parts by weight of rubber (1.5-2 phr), depending on the rubber compound composition.

However, the rubber containing such a small amount of carbon black is not capable of conducting electric current to ensure dissipation of the static electricity charge. The electrical resistance of the solid tires with the outer layer rubber containing 1 wt. % of carbon black is very high and exceeds $10^{10}$ Ohm, i.e., these tires are insulators. Therefore, the static electricity charge accumulating on the mechanism during operation cannot run off the tire into the ground and may cause a significant potential difference between the floor surface and the mechanism which is sufficient to produce a spark discharge threatening human health, and capable of causing fire or explosion in a potentially explosive environment.

The problem of combining the extremely low content of carbon allotropes and the ability to dissipate the electric charge is resolved by adding, for example, electrically conductive metal based fillers, which is technologically challenging, and the difference in the elasticity ratios of the rubber and metal based fillers can cause tire failure during operation.

Adding electrically conductive rubber elements to the non-conductive tread top layer of the tire has been described in many patents. Thus, patent U.S. Pat. No. 6,269,854 describes a tire with a non-conductive top tread layer containing 3 to 20 phr of carbon black, although with a thin strip of electrically conductive rubber passing through the outer layer to its external surface. In this case, the rubber of the electrically conductive strip contains at least 25 phr of carbon black. In this invention, the electrical conductivity of the tread top layer is sacrificed to improve the physical and mechanical properties rather than to obtain non-marking tires, therefore, the carbon black content in the non-conductive tread layer in this invention is claimed to be at least 3 phr.

U.S. Pat. No. 8,356,646 proposes non-marking solid tires of complex design: the outer layer of the tire is made from a non-conductive rubber composition containing less than 2 phr of carbon black giving the ability to leave no marks, while the outer layer of the tire contains a radial electrically conductive channel leading to an electrically conductive inner layer. The spot area of the electrically conductive channel on the outer surface is at least 150 mm$^2$. A drawback of the solution proposed in U.S. Pat. No. 8,356,646 is that it is hard to manufacture, and the use of such tires increases the risk of disrupting the electrical conductivity when the spot of the electrically conductive channel on the tire surface is contaminated.

Patent applications EP 3478485A1 and EP 3481647A1 also propose non-marking solid tires of elaborate design, wherein the electrically conductive rubber composition is used only in the tire sidewall and the peripheral part of the outer surface of the tire contacting the floor, while the tire body and tread are made from a non-abrasive and non-electrically conductive rubber. A drawback of this solution is that such tires are hard to manufacture. Moreover, the sidewalls of the tire are still marking and, therefore, the tire can leave marks on the floor, especially when turning.

Reducing the content of carbon black while providing the necessary electrical conductivity of the rubber composition for tires is disclosed in several inventions and patent applications discussed below by introducing carbon allotropes with a flat or fibrous morphology into the rubber composition: graphite oxide plates, graphene, carbon fibers or nanotubes. Thus, patent CN 108752657 describes a rubber composition for solid tires containing 40-65 parts of natural rubber, 12-20 parts of chloroprene rubber, 10-12 parts of stearic acid, 8-12 parts of aromatic hydrocarbon oil, 2.5-4.5 parts of graphene, 12-18 parts of carbon black, 10-12 parts of tackifying agent, 5-8 parts of carbon nanotubes, 2-6 parts of silane coupling agent, 48 parts of anti-aging agent, 12-18 parts of filler, 6-10 parts of accelerator and 4-8 parts of curing agent. The total content of carbon allotropes in this composition is reduced, however, it still amounts to more than 19.5 parts or more than 10 wt. %. The advantage of the described rubber composition is high elasticity, which is the object of the cited invention, but the drawback of solid tires with this rubber composition is that they leave black marks due to the high content of carbon allotropes.

According to other inventions, introducing carbon nanotubes into the rubber composition for tires can reduce the total amount of carbon materials in the rubber composition even further, however, their total content is more than 1 wt. % of the rubber composition or more than 1.5-2 phr, which does not remove black marks during the operation of the tires made from such material. Patent KR 101703626 describes the composition containing, among others, 2 to 40 phr of carbon black and 0.1 to 1 phr of carbon nanotubes and a tire with its tread made from the composition. Note that these inventions do not require electrical conductivity for the rubber composition.

Patent application CN 109694507 indicates the electrically conductive rubber composition of the solid tire tread with 20-30 phr of conductive carbon black, 30-35 phr of carbon black, and 3-5 phr of single wall carbon nanotubes. Thus, the total amount of all carbon allotropes is at least 53 phr, i.e., more than 30 wt. % of the total rubber composition. A drawback of the composition proposed by patent application CN 109694507 is that the solid tire with this rubber composition leaves black marks due to the high amount of conductive carbon black and carbon black. Another drawback of the rubber composition proposed by patent application CN 109694507 is high cost due to the high content of single wall carbon nanotubes.

SUMMARY OF THE INVENTION

The present invention solves the problem of creating rubber compositions for solid tires of extremely simple design and processability that ensure safe and hygienic operation of this tire without accumulating the static electricity charge and leaving black marks on the floor surface.

For safe and hygienic operation of the tire, after curing the rubber composition shall have a specific electrical conductivity of at least $10^{-7}$ S/m (a volume resistivity not more than $10^7$ Ohm·m) and contain no more than 1.5 phr of all carbon allotropes.

To solve this problem, the present invention proposes an electrically conductive rubber composition for non-marking solid tires containing, before curing, (1) rubber or a mixture of rubbers, (2) oxide fillers and modifiers, (3) organic plasticizers and modifiers, (4) curing system, (5) carbon nanotubes, with the total content of the carbon nanotubes and other carbon allotropes 0.05 to 1.5 wt. % of the rubber content.

This problem is also solved by providing the non-marking solid tire made with the use of the electrically conductive rubber composition.

The rubber composition refers to a mixture containing the described components before curing.

The rubber composition can be cured, and in the course of curing, the chemical makeup of the rubber composition changes as a result of chemical transformations in the curing process.

The mixture of components can be obtained by any known method of mixing the rubber compounds, including internal rubber mixers with different geometry of chambers and rotors, open mills (two-roll rubber mills), double screw mixers, extruders, etc., and two- or multi-stage processes with various combinations of mixing methods. Mixing is possible at elevated temperatures. The mixing process can include the rubber mixture cooling and maturing stages. The mixture is cured by any known method, including, for example, pressure curing, vacuum curing, superheated steam curing, etc., but is not limited to the examples.

The term "electrically conductive" means that the cured product of the rubber composition can conduct the electric current which is sufficient to dissipate the static electricity charge and has a specific volume conductivity of at least $10^{-7}$ S/m. For some applications (additionally defined by operating conditions), a specific volume conductivity of at least $10^{-5}$ S/m is preferred. For some applications, a specific volume conductivity of at least $10^{-3}$ S/m is preferred.

Synthetic or natural, saturated or unsaturated rubbers can be used as rubber, for example, natural or synthetic isoprene rubbers, styrene butadiene rubbers, nitrile butadiene rubbers, hydrogenated nitrile butadiene rubbers, butadiene rubbers, butyl rubbers, halobutyl rubbers, ethylene propylene rubbers, ethylene propylene diene monomer rubbers containing ethylene norbornene or dicyclopentadiene as the third monomer, propylene oxide rubbers, acrylate rubbers, carboxylate rubbers, chloroprene rubbers, fluoroelastomers, or combinations thereof, but not limited to the examples. Oil-filled rubber can be used as rubber, i.e., synthetic rubber, wherein organic plasticizers (oils) are added at one of their production stages.

The term "oxide fillers and modifiers" refers to the materials based on inorganic compounds containing oxygen, which are added to the rubber mixtures to change the physical and mechanical or physical and chemical properties of the rubber mixture, including, for example, changing one or more of the following properties: stiffness, strength, abrasion resistance, hardness, viscosity, dynamic properties, chemical resistance, ageing resistance, fire resistance, gas permeability, thermal conductivity, wettability or appearance, including the color of the rubber mixture (pigments).

The oxide fillers and modifiers can be mixed oxides of two or more chemical elements, including, for example, mixed oxides of one or more metals and aluminum (aluminates), one or more metals and silicon (silicates), one or more metals and carbon (carbonates), and one or more metals, aluminum and silicon (aluminosilicates) or others, but not limited to these examples.

The oxide fillers and modifiers can also contain other anions (for example, hydroxyl groups, chloride, fluoride, or others), such as hydroxysilicates or hydroxyaluminosilicates, for example, montmorillonite, talc, mica, or others, but not limited to these examples.

The amount of the oxide fillers and modifiers in the rubber composition can vary from 20 phr to 150 phr, depending on the requirements for the rubber composition and the materials selected as the oxide fillers and modifiers.

Carbon-organic or silicon-organic components of the rubber mixture can be used as organic plasticizers and modifiers, which are added to increase plasticity, reduce viscosity, change the glass transition temperature, change color or other properties of the rubber composition during preparation and subsequent operation, for example, esters of orthophthalic acid, esters of phosphoric acid, alcohols or phenols, esters of aliphatic carboxylic acids and glycols, esters of trimellitic acid and alcohol, petroleum oils (paraffin, naphthenic, aromatic), or combinations thereof, but not limited to these examples.

The organic plasticizers can be added to the synthetic rubber (oil-filled rubber) by the rubber manufacturer at one of its production stage in advance.

One or more organic dyes can be used as organic modifiers to change the color of the rubber composition, for example, monoazo dyes, disazo dyes, anthraquinone dyes, phthalocyanine dyes, or combinations thereof, but not limited to the examples.

The amount of organic plasticizers and modifiers in the rubber mixture can vary from 1 phr to 100 phr, depending on the requirements for the rubber composition and the materials selected as the oxide fillers and modifiers.

The term "curing system" refers to a mixture of curing agents, curing activators, curing accelerators and, if necessary, curing inhibitors.

Curing agents refer to the ingredients of the rubber mixtures, which cross-link the rubber macromolecules in the course of curing, for example, sulfur; organic peroxides such as dicumyl peroxide, 2,5-Di(tert-butylperoxy)-2,5-dimethylhexane, 1,3- and 1,4-Di(tert-butylperoxyisopropyl)benzene, 1,1-Di(tert-butyl-peroxy)-3,5,5-trimethylcyclohexane, n-dimethyl-2,5-di(tert-butyl-peroxy)hexine-3,3,3,5,7,7,-pentamethyl-1,2,4-trioxepan, dibenzoyl peroxide, bis(2,4-dichlorobenzoyl)peroxide, bis(4-methylbenzoyl)peroxide, or combinations thereof, but not limited to these examples.

The amount of curing agents in the rubber composition can vary from 0.5 to 5 phr.

The curing system can also include curing accelerators, i.e., rubber mixture components used to increase the cure rate and improve the physical and mechanical properties of rubbers, for example: guanidines (N,N'-Diphenylguanidine, N,N'-Diortholylguanidine), dithiocarbamates (zinc dimethyldithiocarbamate, zinc diethyldithiocarbamate, zinc dibutyldithiocarbamate, zinc ethylphenyldithiocarbamate, zinc dibenzyldithiocarbamate, zinc diisobutyldithiocarbamate, bismuth dimethyldithiocarbamate, cadmium diethyldithiocarbamate, copper dimethyldithiocarbamate, lead dimethyldithiocarbamate, lead diamyldithiocarbamate, selenium dimethyldithiocarbamate), thiazoles (2-mercaptobenzothiazole, zinc salt of mercaptobenzothiazole, dibenzothiazolyldisulfide), sulfenamides (N-cyclohexyl-2-benzothiazolylsulfenamide, N-tert-butyl-2-benzothiazolylsulfenamide, N-oxydiethylene-2-benzothiazolylsulfenamide, N.N'-dicyclohexyl-2-benzothiazolylsulfenamide, N-tert-butyldi(2-benzothiazolyl)sulfenamide, N-oxydiethylenethiocarbamyl-N-oxydi-ethylenesulfenamide), thiocarbamates (ethylene thiourea, diethylthiourea, N,N'-dibu tylthiourea, N,N'-diphenylthiourea), thiurams (tetrabutylthiuram disulfide, tetramethylthiuram mono sulfide, tetramethylthiuram disulfide, N,N'-dimethyl-N,N'-diphenylthiuram disulfide, tetrabenzyl thiuram disulfide, dipentamethylenethiuram tetrasulfide, tetraisobutylthiuram disulfide, tetraisobutyl thiuram monosulfide) or combinations thereof, but not limited to the examples.

The amount of curing accelerators in the rubber composition can vary from 0.1 to 7 phr.

The curing system can also include curing activators, i.e., rubber mixture components that increase the accelerator performance, for example, inorganic activators such as zinc oxide, magnesium oxide, zinc carbonate; organic activators such as, but not limited to, stearic acid, zinc stearate, zinc octoate, oleic acid, diethylene glycol, triethanolamine, or combinations thereof, but not limited to the examples.

The amount of curing activators in the rubber composition can vary from 0.5 to 20 phr.

The carbon nanotubes refer to cylindrical carbon nanostructures with a diameter 0.7 to 50 nm that include one or more carbon (graphene) layers. Single wall carbon nanotubes and/or double wall carbon nanotubes and/or triple wall carbon nanotubes and/or multi-wall carbon nanotubes can be used in the rubber composition of the present invention. The surface of the carbon nanotubes can be modified with functional moieties, such as carboxyl or hydroxyl, or organic groups, such as those containing one or more amino groups and/or sulfoxy groups and/or epoxy groups and/or peroxy groups and/or other groups, but not limited to the examples. The structure of the carbon nanotubes can contain heteroatoms, for example, nitrogen atoms, etc. Single wall carbon nanotubes with a diameter more than 0.7 and less than 6 nm can be used as carbon nanotubes.

The amount of carbon nanotubes in the rubber composition can be 0.05 to 1.5 phr.

The carbon allotropes refer to carbon phases, particles, or structures, wherein carbon atoms are arranged in various ways in the crystal lattice, for example, amorphous carbon allotropes such as carbon or soot, but not limited to these examples, or nanotubes, or graphene, or fullerenes, or graphite, or nanofibers, or combinations thereof, but not limited to these examples.

The rubber composition can contain the amounts of particles of carbon allotropes other than carbon nanotubes such that the total content of all carbon allotropes in the rubber composition does not exceed 1.5 phr.

In addition to the components listed above, the rubber mixture can contain other components, such as particles of metals of groups 8-11 in the periodic table, for example, iron, cobalt, nickel, ruthenium, rhodium, palladium, iridium, platinum, copper, silver, gold or their alloys, but not limited to the examples. Metal particles can be introduced to the rubber mixture together with carbon nanotubes as impurities, which are due to how the carbon nanotubes are prepared. The metal particles can be added to the rubber composition intentionally to modify one or more properties of the rubber.

The electrical conductivity of this rubber composition is ensured by carbon nanotubes and/or their bundles. Other electrically conductive components, including carbon allotropes other than carbon nanotubes, are allowed in the composition, but the total amount of all carbon allotropes, including carbon nanotubes, should not exceed 1.5 phr, preferably not more than 1 phr, most preferably not more than 0.5 phr.

As illustrated by the Examples, the amount of nanotubes ranging from 0.05 to 1.5 phr is sufficient to provide the necessary electrical conductivity, if the nanotubes in the rubber composition are bundled. The single wall and double wall nanotubes are known for the ability to bundle due to the Van der Waals forces (π-π interaction). As the nanotubes are bundled, both the diameter and the length of the bundle increase, and the length/diameter ratio of the nanotube bundle grows as the number of nanotubes in the bundle increases.

It is also known that the greater the length/diameter ratio of the particles in the conductive filler, the lower is the lowest concentration of the conductive filler ensuring a coherent conductive cluster (percolation threshold). Therefore, the number of nanotubes in the bundle, and, therefore, the diameters of the nanotube bundles in the rubber composition are preferred to be as large as possible, for example, more than 300 nm, preferably more than 1 μm, most preferably more than 3 μm to achieve a lower percolation threshold.

On the other hand, multiple thin nanotube bundles are preferred in the material to ensure the homogeneity of the material, preserve its physical and mechanical properties (including strength and wear resistance) and reduce the contact resistance of the material. Therefore, a rubber composition is preferred, wherein the nanotubes are combined to bundles with a wide bundle diameter distribution, such as 10 nm to 500 nm, or more preferably 5 nm to 1 μm, or even more preferably 3 nm to 3 μm.

The multi-wall nanotubes are usually combined into tangle-like agglomerates, but not bundles. The tangle-like nanotube agglomerates in the material are undesired. Therefore, single wall or double wall carbon nanotubes are preferred in the rubber composition. Carbon nanotubes, especially single wall and double wall carbon nanotubes, especially single wall carbon nanotubes are expensive. Therefore, the amount of carbon nanotubes in the rubber mixture should not exceed 1.5 phr, preferably not more than 1 phr, even more preferably not more than 0.8 phr, most preferably not more than 0.5 phr.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Reference will now be made in detail to the embodiments of the present invention, examples of which are illustrated in the accompanying drawings.

The proposed invention is illustrated by the following examples.

Example 1

Before curing, the rubber composition contains:
(1) mixture of natural rubber NR-CV60 85 parts and butadiene rubber BR9000 (15 parts),
(2) oxide fillers and modifiers: precipitated $SiO_2$ Z-155 (50 parts),
(3) organic plasticizers and modifiers: naphthenic oil KN4010 5 parts, bis(triethoxysilylpropyl)tetrasulfide (TESPT, Si-69) (5 parts), polyethylene glycol ester (3.5 parts),
(4) curing system: sulfur (1 part), stearic acid (2 parts), ZnO (5 parts), tetrabenzylthiuram disulfide (TBzTD) (0.5 parts), sulfenamide C (N-cyclohexyl-2-benzothiazolylsulfenamide, CBS) (2 parts),
(5) TUBALL™ single wall carbon nanotubes (0.38 parts).

Figure 1:
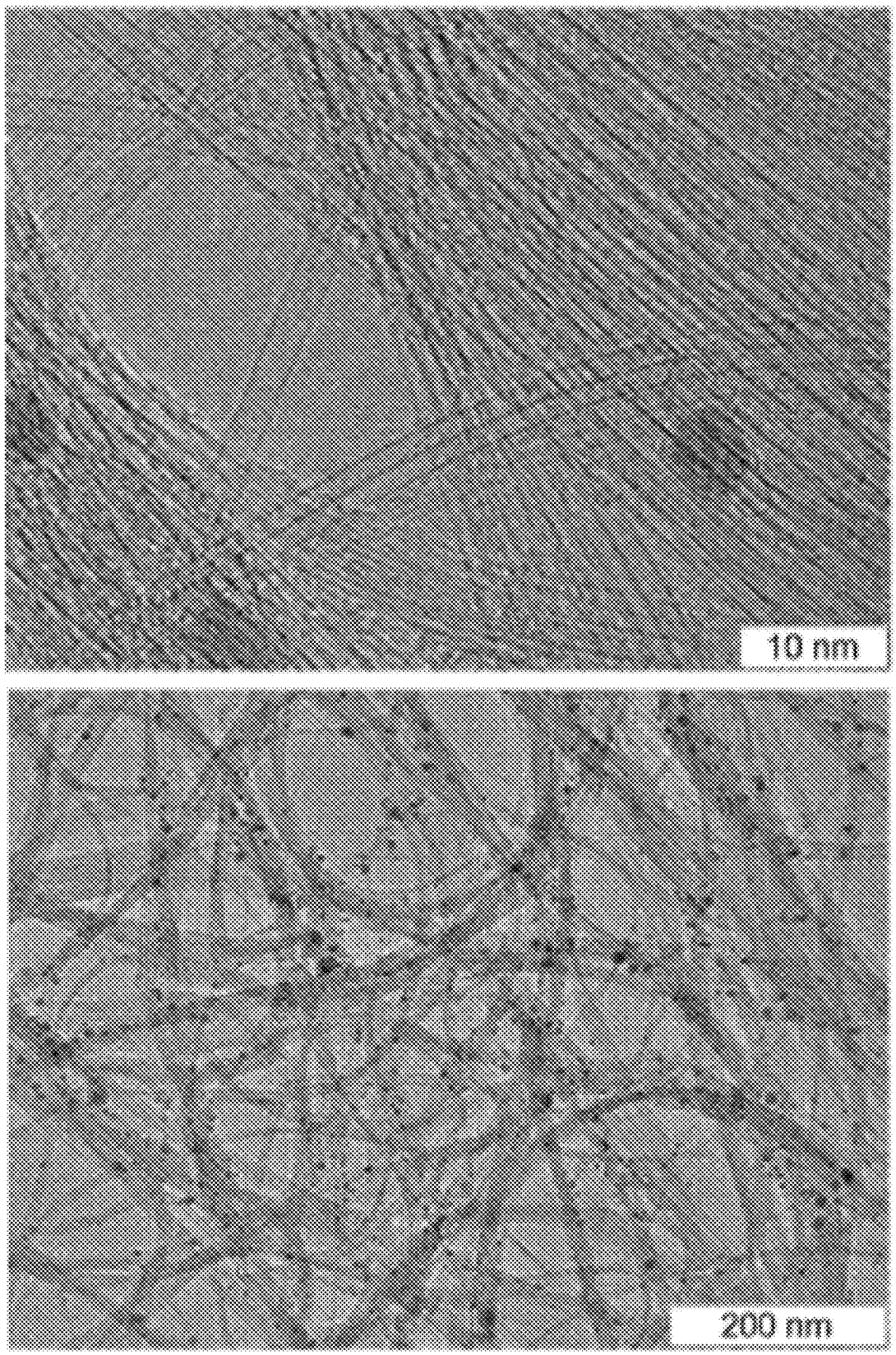
FIG. 1 shows the transmission electronic micrographs of the single wall carbon nanotubes used in Example 1.

Carbon allotropes other than carbon nanotubes are present as TUBALL™ impurities (0.02 parts). The transmission electronic micrographs of the single wall carbon nanotubes used are shown in FIG. 1. No other carbon allotropes were added to the rubber composition, although a small amount (about 5 wt. %) of amorphous carbon and graphite-like carbon particles are contained in TUBALL™ as impurities. Therefore, the total amount of carbon allotropes is 0.4 parts. The average diameter of the TUBALL™ single wall carbon nanotubes is 1.6 nm, the length exceeds 5 μm, and the length/diameter ratio exceeds 3,000. The rubber composition also contains 0.06 parts of metallic iron found in the TUBALL™ single wall carbon nanotubes as impurity.

The rubber composition was made by a two-stage mixing method: in the first stage, the rubbers were mixed with silicon oxide and organic plasticizers and modifiers, as well as stearic acid and zinc oxide in the internal rubber mixer with a temperature increase to 140° C., and in the second stage, the remaining components of the curing system and single wall carbon nanotubes were added using the two-roll rubber mill with a gap of 2-3 mm until the curing system was completely mixed.

Figure 2:
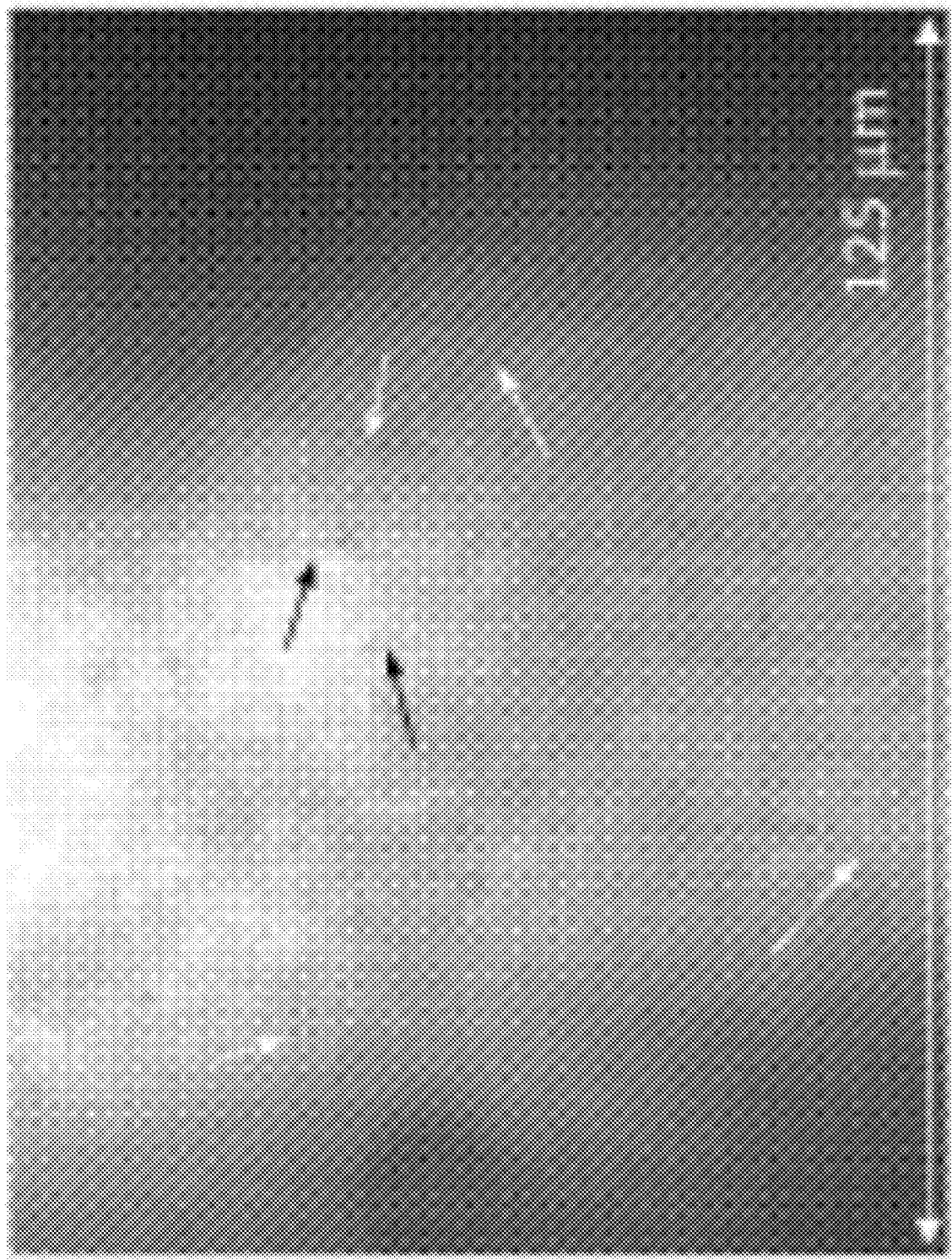
FIG. 2 shows optical micrographs of a cured rubber mixture cut from Example 1.

The curing was performed on a curing press at 200 kgf/cm² and 170° C. for 8 minutes. The optical micrographs of a cured rubber mixture cut are shown in FIG. 2. The micrographs were obtained using the Leica 100x Oil N PLAN immersion lens with a numerical aperture 1.25. The micrographs show multiple bundles of the TUBALL™ single wall carbon nanotubes (marked by arrows in FIG. 2)

with a thickness exceeding the resolution limit of the lens, i.e., more than 300 nm, however, chromatic aberration can be seen near the image of the bundles, which indicates their diameter 300-350 nm. The micrographs also show poorly resolved shadows from the network of nanotube bundles with a diameter less than 300 nm. Based on these data, it can be concluded that the nanotube bundles are distributed over the diameter in a range up to 350 nm.

The electrical conductivity and surface electrical resistivity of the rubber composition after curing are summarized in Table 1. The data in the table indicate that the rubber composition from Example 1 is electrically conductive and can dissipate the static electricity charge.

Invention Embodiments

Example 2

A rubber composition similar to Example 1, although with 0.05 phr of the TUBALL™ single wall carbon nanotubes and additional 0.9 phr of the KetjenBlack EC-300J electrically conductive carbon black. The electrical conductivity and surface electrical resistivity of the rubber composition after curing are summarized in Table 1. The data in the table indicate that the rubber composition from Example 2 is electrically conductive and can dissipate the static electricity charge. The rubber composition from Example 2 does not meet the requirements of EN 1755 and cannot be used for the tires operated in potentially explosive atmospheres. However, the rubber composition from Example 2 can be used for the tires operating in rooms not imposing such restrictions.

Example 3

Figure 3:
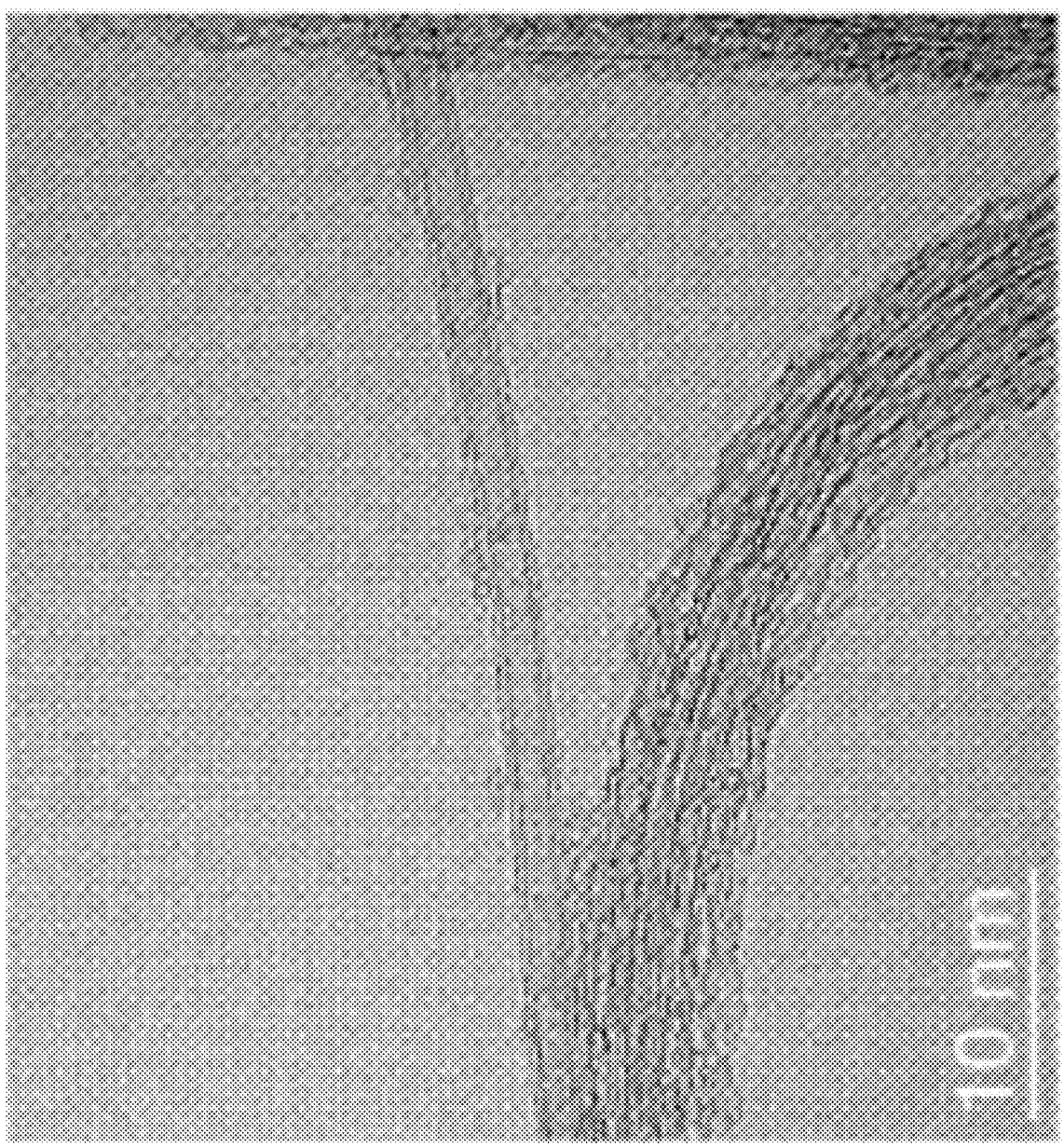
FIG. 3 shows the transmission electronic micrographs of the single wall and double wall carbon nanotubes used in Example 3.
Figure 4:
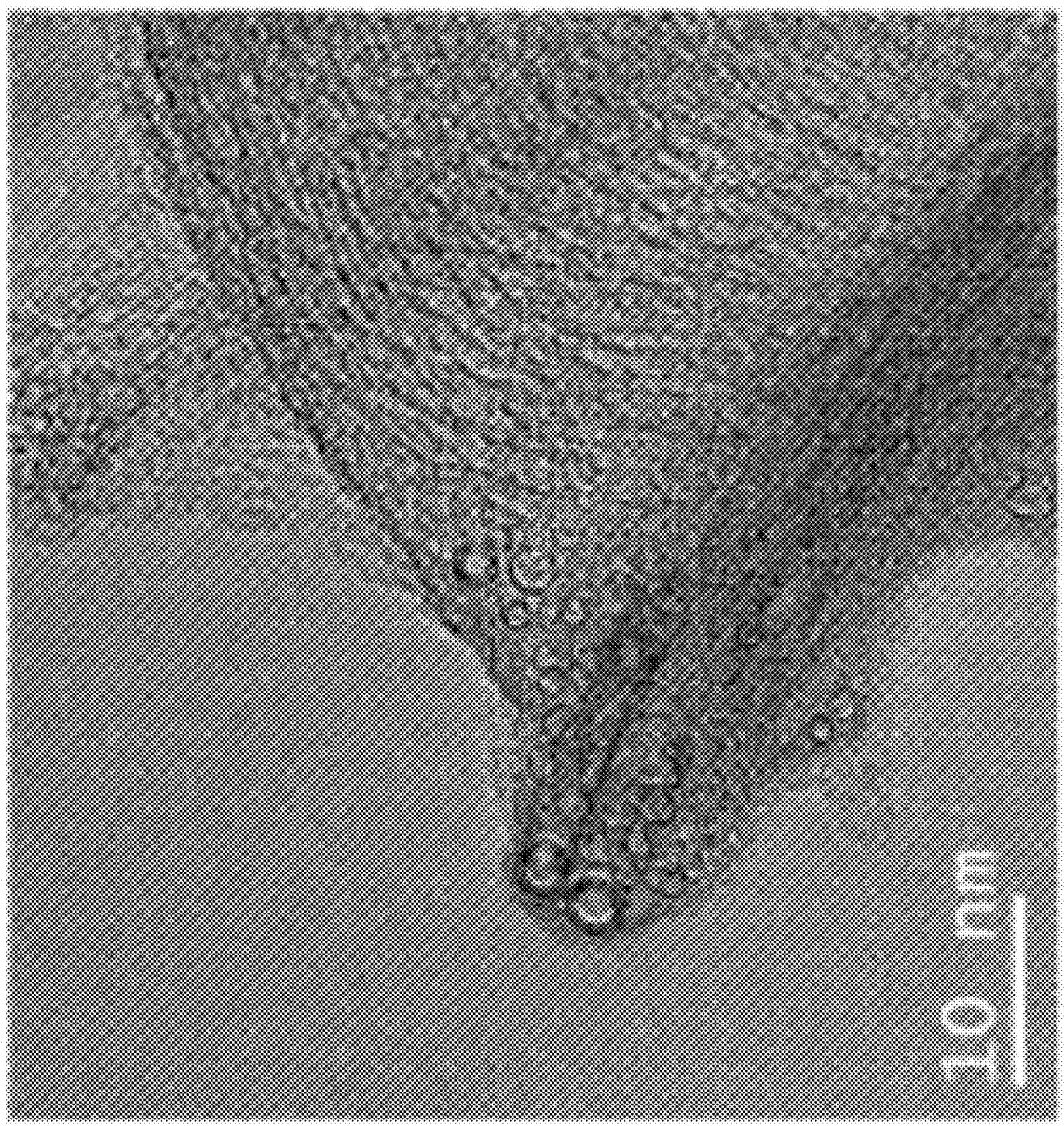
FIG. 4 shows the transmission electronic micrographs of a cured rubber mixture chip in Example 3.

A rubber composition similar to Example 1, although with 0.24 phr of mixed single wall and double wall carbon nanotubes with a significant amount of fullerene-like carbon and 0.25 phr of the VULCAN® XC-72 by Cabot carbon black instead of 0.19 phr of the TUBALL™ single wall carbon nanotubes. The transmission electronic micrographs of the single wall and double wall carbon nanotubes used are shown in FIG. 3. The transmission electronic micrographs of a cured rubber mixture chip are shown in FIG. 4. The electrical conductivity and surface electrical resistivity of the rubber composition after curing are summarized in Table 1. The data in the table indicate that the rubber composition from Example 3 is electrically conductive and can dissipate the static electricity charge.

Example 4

A rubber composition similar to Example 1, although with two roll rubber mill used for mixing. The mixture was prepared in one stage with a gap between the rolls of 2 mm. The total mixing time was 30 minutes. First, rubbers were mixed, then the rubbers were mixed with the curing group, silicon oxide, organic plasticizers and modifiers, and with single wall carbon nanotubes. The electrical conductivity and surface electrical resistivity of the rubber composition after curing are summarized in Table 1. The data in the table indicate that the rubber composition from Example 4 is electrically conductive and can dissipate the static electricity charge.

Example 5

Before curing, the rubber composition contains
(1) natural rubber NR SVR-3L (100 phr),
(2) oxide fillers and modifiers: precipitated $SiO_2$ Z-155 (50 phr), calcium carbonate (15 phr),
(3) organic plasticizers and modifiers: naphthenic oil Nytex 810 (6 phr, bis(triethoxysilylpropyl)tetrasulfide (TESPT, Si-69) (4 phr), polyethylene glycol ester (3.5 phr),
(4) curing system: sulfur (2 phr), stearic acid (1.5 phr), ZnO 5 phr, tetramethylthiuram monosulfide (TMTM) (0.5 phr), N-tert-butyl-2-benzothiazolylsulfenamide (TBBS) (2 phr).
(5) TUBALL™ single wall carbon nanotubes (0.76 phr).

Carbon allotropes other than carbon nanotubes are present as TUBALL™ impurities (0.04 phr). The transmission electronic micrographs of the single wall carbon nanotubes used are shown in FIG. 1. The rubber composition also contains 0.12 phr of metallic iron found in the TUBALL™ single wall carbon nanotubes as impurity and additionally 10 phr of PMS-1 electrolytic copper powder.

The rubber composition was made by a two-stage mixing method: in the first stage, the rubbers were mixed with silicon oxide, organic plasticizers and modifiers and metallic copper powder, as well as stearic acid and zinc oxide in the internal rubber mixer with a temperature increase to 140° C., and in the second stage, the remaining components of the curing system and single wall carbon nanotubes were also added to the internal mixer with a temperature increase to 110° C.

Curing was performed on a curing press at 200 $kgf/cm^2$ and 160° C. for 20 minutes.

The electrical conductivity and surface electrical resistivity of the rubber composition after curing are summarized in Table 1. The data in the table indicate that the rubber composition from Example 5 is electrically conductive and can dissipate the static electricity charge.

Example 6

Before curing, the rubber composition contains:
(1) mixture of natural rubber NR-CV50 (90 phr) and butadiene rubber BR9000 (10 phr),
(2) oxide fillers and modifiers: precipitated $SiO_2$ Zeosil 1165-MP (50 phr), white pigment $TiO_2$ (5 phr),
(3) organic plasticizers and modifiers: naphthenic oil KN4010 (5 phr), bis-(triethoxysilylpropyl) tetrasulfide (TESPT, Si-69) (4 phr), antioxidant N-isopropyl-N-phenyl-p-phenylene diamine (IPPD) (0.5 phr),
(4) curing system: sulfur (1 phr), stearic acid (3 phr), ZnO (8 phr), N,N'-diphenylguanidine (DPG-80) (1 phr), N-oxydiethylene-2-benzothiazolylsulfenamide (NOBS) (1.25 phr).
(5) TUBALL™ single wall carbon nanotubes (0.38 phr).

Carbon allotropes other than carbon nanotubes are present as TUBALL™ impurities (0.02 phr). The transmission electronic micrographs of the single wall carbon nanotubes used are shown in FIG. 1. The rubber composition also contains 0.04 phr of metallic iron found in the TUBALL™ single wall carbon nanotubes as impurity.

The rubber composition was made by a two-stage mixing method: in the first stage, the rubbers were mixed with silicon oxide and organic plasticizers and modifiers, an antioxidant, as well as stearic acid and zinc oxide in the internal rubber mixer with a temperature increase to 140° C., and in the second stage, the remaining components of the curing system and single wall carbon nanotubes were also added to the internal rubber mixer with a temperature increase to 110° C.

Curing was performed on a curing press at 200 kgf/cm² and 160° C. for 8 minutes.

The electrical conductivity and surface electrical resistivity of the rubber composition after curing are summarized in Table 1. The data in the table indicate that the rubber composition from Example 6 is electrically conductive and can dissipate the static electricity charge.

Example 7

A rubber composition similar to Example 6, although with an additional oxide color modifier: a joint oxide of Na, Al, Si and S—alumina-sodium silicate containing sulfur (the pigment is ultramarine GOST 9980-75, color index number 80-450-6-01) — 2 parts by weight per 100 parts by weight of the mixture of rubbers. The electrical conductivity and surface electrical resistivity of the rubber composition after curing are summarized in Table 1. The data in the table indicate that the rubber composition from Example 7 is electrically conductive and can dissipate the static electricity charge.

Example 8

Before curing, the rubber composition contains:
(1) mixture of isoprene rubber Natsyn 2200 75 phr and butadiene rubber BR 065 (25 phr),
(2) oxide fillers and modifiers: precipitated SiO₂ Zeosil 1165-MP (30 phr), kaolin (20 phr), calcium carbonate (15 phr), TiO₂ (5 phr),
(3) organic plasticizers and modifiers: naphthenic oil KN4010 5 phr, bis-(triethoxysilylpropyl)tetrasulfide (TESPT, Si-69) (4 phr), polyethylene glycol ester (3.5 phr), 2-mercaptobenzimidazole (MBI) (1 phr),
(4) curing system: sulfur (1 phr), stearic acid (3 phr), ZnO (8 phr), N,N'-diphenylguanidine (DPG-80) (1 phr), N-oxydiethylene-2-benzothiazolylsulfenamide (NOBS) (1.25 phr),
(5) TUBALL™ single wall carbon nanotubes 0.38 phr.

Carbon allotropes other than carbon nanotubes are present as TUBALL™ impurities (0.02 phr). The transmission electronic micrographs of the single wall carbon nanotubes used are shown in FIG. 1. The rubber composition also contains 0.04 phr of metallic iron found in the TUBALL™ single wall carbon nanotubes as impurity.

The rubber composition was made by a two-stage mixing method: in the first stage, the rubbers were mixed with silicon oxide, organic plasticizers and modifiers, an antioxidant, as well as stearic acid and zinc oxide in the internal rubber mixer with a temperature increase to 140° C., and in the second stage, the remaining components of the curing system and single wall carbon nanotubes were added using two roll rubber mill (two-roller mill) with a gap of 2-3 mm until the curing system was completely mixed.

Curing was performed on a curing press at 200 kgf/cm² and 160° C. for 8 minutes.

Figure 5:
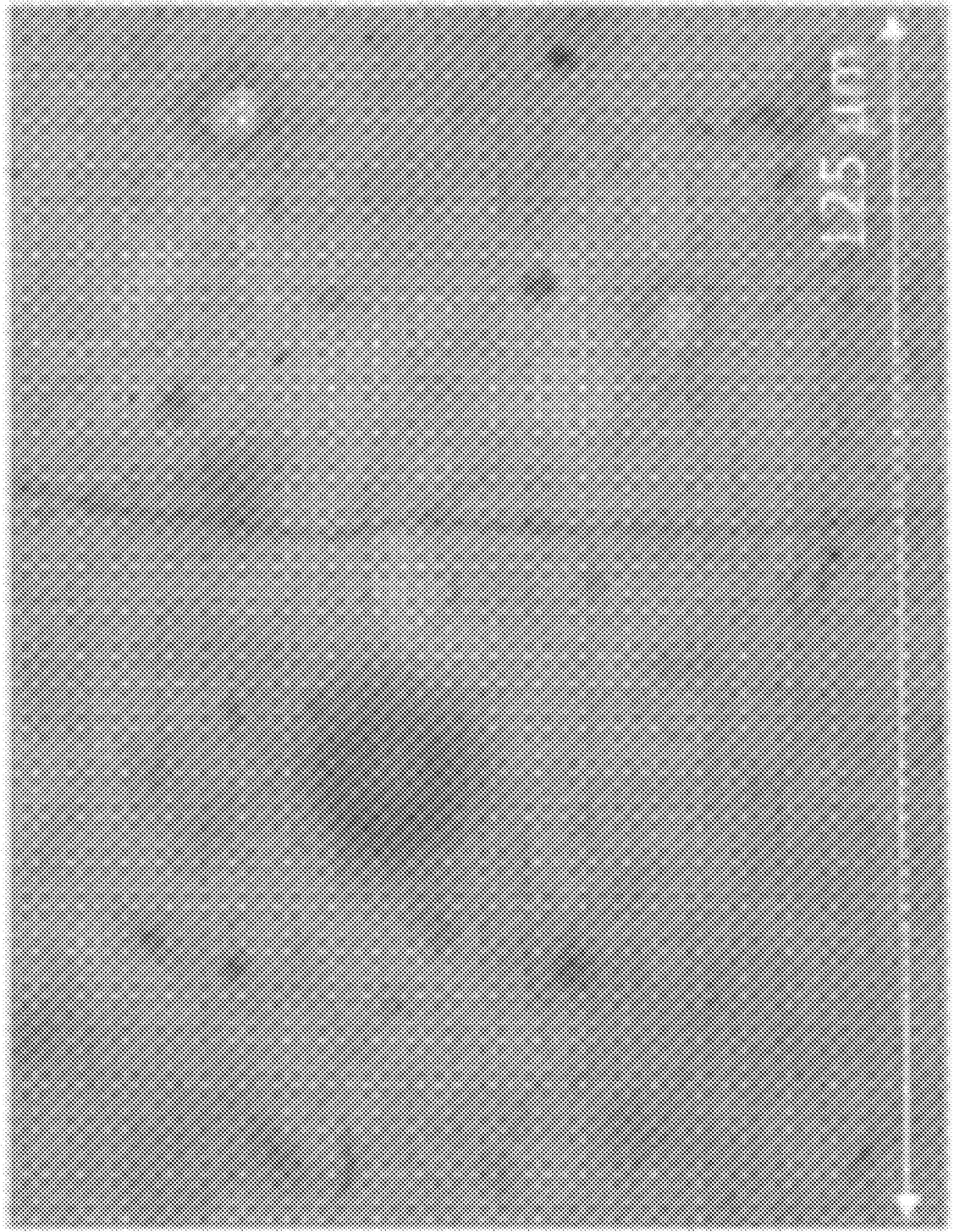
FIG. 5 shows optical micrographs of a cured rubber mixture cut from Example 8.

The optical micrographs of a cured rubber mixture cut are shown in FIG. 5. The micrographs were obtained using the Leica 100x N PLAN immersion lens with a numerical aperture 1.25. The micrographs show multiple bundles of the TUBALL™ single wall carbon nanotubes with a thickness ranging from the microscope resolution limit (300 nm) to 2 μm. Based on these data, it can be concluded that the nanotube bundles are distributed over the diameter in a range from 300 nm and 2 μm.

The electrical conductivity and surface electrical resistivity of the rubber composition after curing are summarized in Table 1. The data in the table indicate that the rubber composition from Example 8 is electrically conductive and can dissipate a static electricity charge.

Example 9

Figure 6:
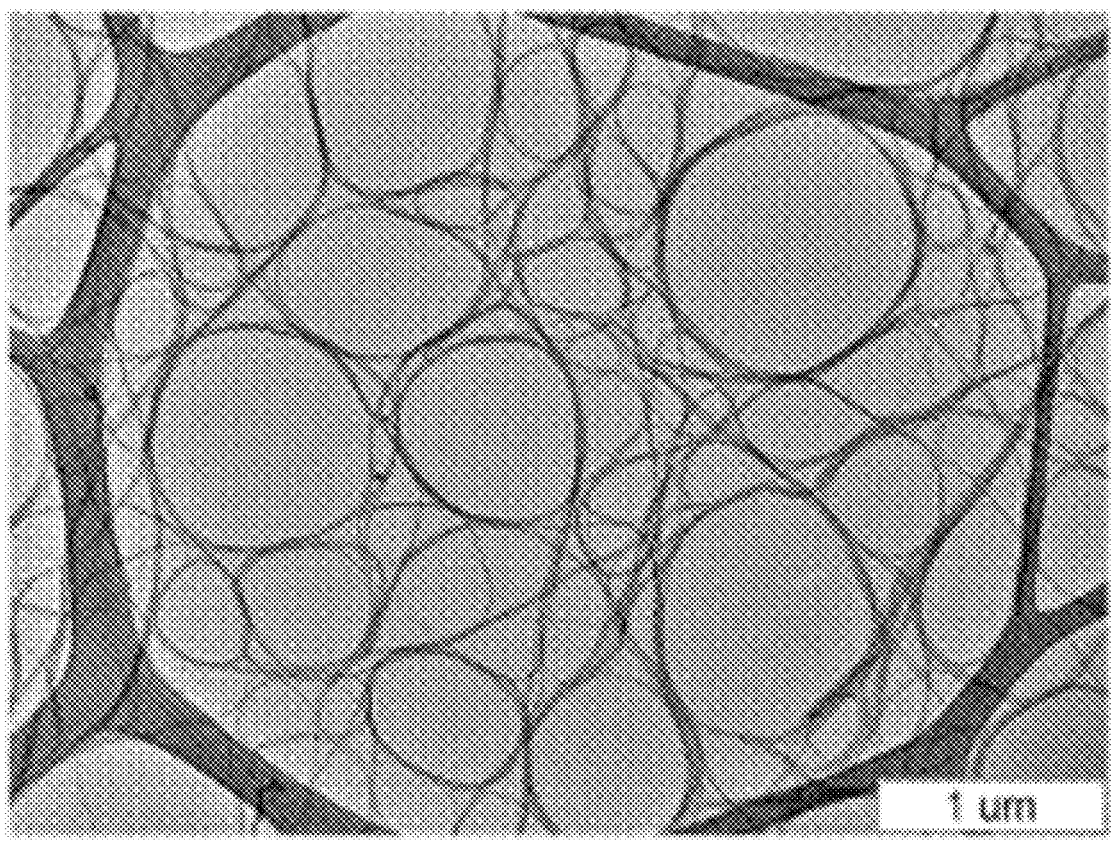
FIG. 6 shows the transmission electronic micrographs of the purified single wall carbon nanotubes TUBALL™ 99 from Example 9.
Figure 6:
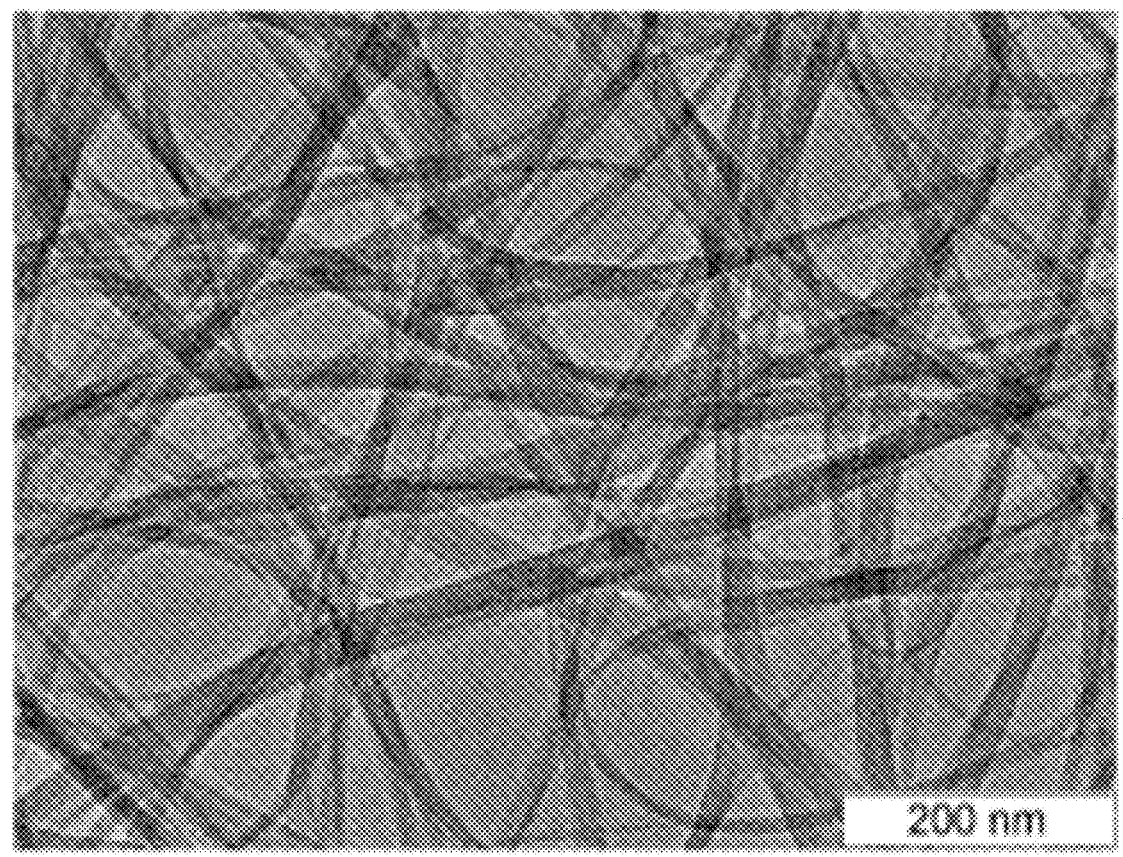
Figure 7:
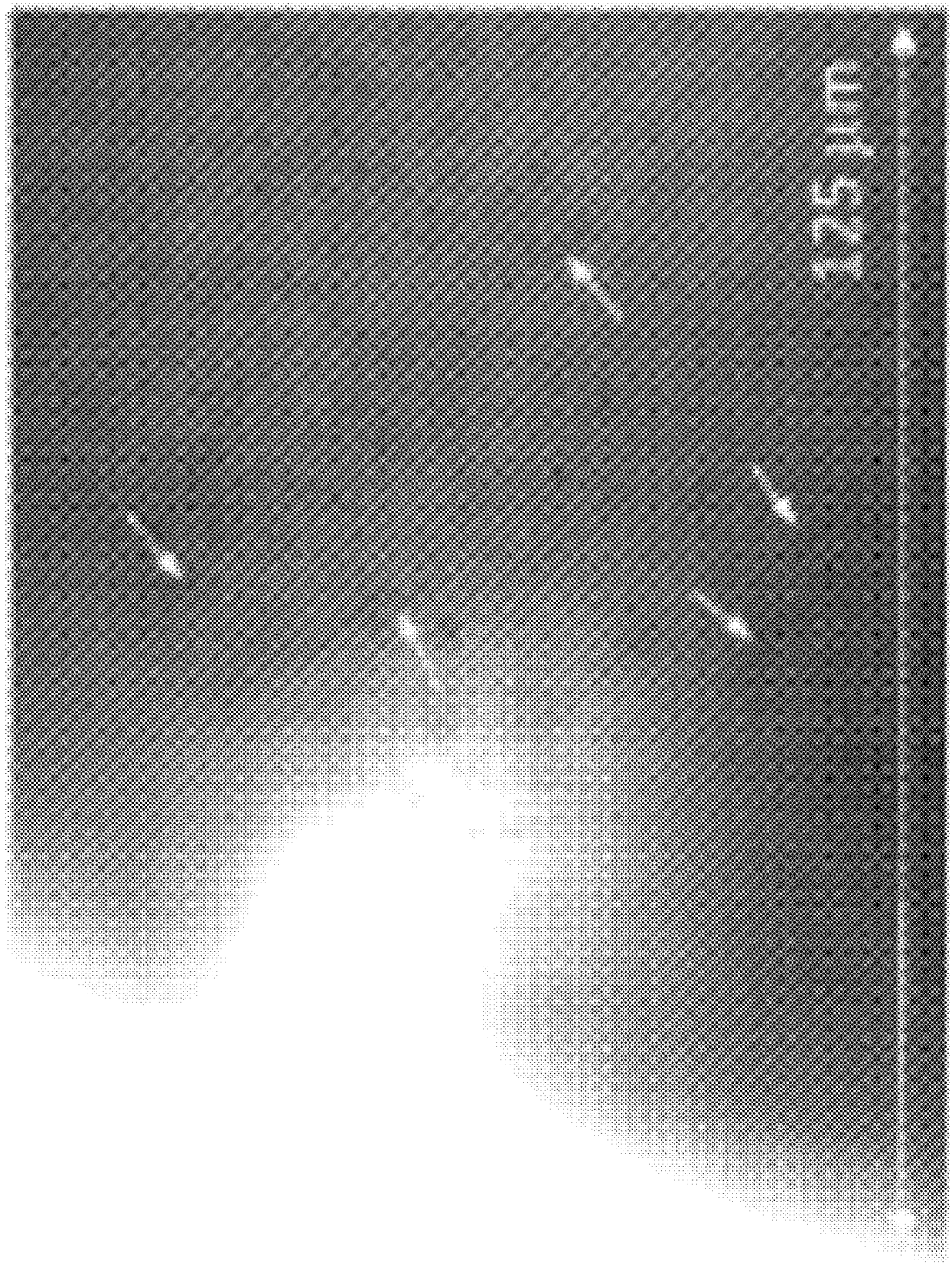
FIG. 7 shows optical micrographs of a cured rubber mixture cut from Example 9.

A rubber composition similar to Example 8, although purified TUBALL™ 99 single wall carbon nanotubes with no impurities of iron and carbon allotropes, other than carbon nanotubes, are used instead of the TUBALL™ single wall carbon nanotubes. The transmission electronic micrographs of the purified TUBALL™ 99 single wall carbon nanotubes are shown in FIG. 6. The TUBALL™ 99 single wall carbon nanotubes are introduced at the first rubber mixture preparation stage. The optical micrographs of a cured rubber mixture cut are shown in FIG. 7. The micrographs were obtained using the Leica 100x Oil N PLAN immersion lens with a numerical aperture 1.25. The micrographs show multiple bundles of the TUBALL™ single wall carbon nanotubes (marked by arrows in FIG. 7) with a thickness exceeding the resolution limit of the lens, i.e., more than 300 nm and up to 1 μm. The electrical conductivity and surface electrical resistivity of the rubber composition after curing are summarized in Table 1. The data in the table indicate that the rubber composition from Example 9 is electrically conductive and can dissipate the static electricity charge.

Example 10

A rubber composition similar to Example 8, although with 1.43 phr of the TUBALL™ single wall carbon nanotubes and a total amount of carbon allotropes 1.5 phr. The electrical conductivity and surface electrical resistivity of the rubber composition after curing are summarized in Table 1. The data in the table indicate that the rubber composition from Example 10 is electrically conductive and can dissipate the static electricity charge.

Example 11

Before curing, the rubber composition contains:
(1) mixture of natural rubber NR-CV60 (85 phr) and butadiene rubber BR9000 (15 phr),
(2) oxide fillers and modifiers: precipitated SiO₂ Z-155 (50 phr),
(3) organic plasticizers and modifiers: naphthenic oil KN4010 (5 phr), bis(triethoxysilylpropyl)tetrasulfide (TESPT, Si-69) (5 phr), polyethylene glycol ester (3.5 phr),
(4) curing system: sulfur (1 phr), stearic acid (2 phr), ZnO (5 phr), tetrabenzylthiuram disulfide (TBzTD) (0.5 phr), sulfenamide C (N-cyclohexyl-2-benzothiazolylsulfenamide, CBS) (2 phr),
(5) purified TUBALL™ 99 single wall carbon nanotubes (0.39 phr).

Additionally, lubricating graphite of grade GS-2 (1 phr) was added to the rubber composition. The transmission electronic micrographs of the purified TUBALL™ 99 single wall carbon nanotubes are shown in FIG. 6. Thus, the total amount of all carbon allotropes in the rubber composition is 1.39 phr.

The rubber composition was made by a two-stage mixing method: in the first stage, the rubbers were mixed with silicon oxide and organic plasticizers and modifiers, as well as stearic acid, zinc oxide and GS-2 graphite in the internal rubber mixer with a temperature increase to 140° C., and in the second stage, the remaining components of the curing system and single wall carbon nanotubes were added to the internal rubber mixer at a temperature up to 100° C.

Curing was performed on a curing press at 200 kgf/cm$^2$ and 170° C. for 10 minutes.

The data on electrical conductivity and surface electrical resistivity of the rubber composition after curing are summarized in Table 1. The data in the table indicate that the rubber composition from Example 11 is electrically conductive and can dissipate the static electricity charge.

Example 12

A rubber composition similar to Example 11, although with 0.5 phr of the GS-2 graphite and additionally 18 phr of powder of the PNK-1L8 electrolytic nickel introduced at the first mixing stage. The electrical conductivity and surface electrical resistivity of the rubber composition after curing are summarized in Table 1. The data in the table indicate that the rubber composition from Example 12 is electrically conductive and can dissipate the static electricity charge.

Example 13

A rubber composition similar to Example 11, although with 0.3 phr of the GS-2 graphite. The electrical conductivity and surface electrical resistivity of the rubber composition after curing are summarized in Table 1. The data in the table indicate that the rubber composition from Example 13 is electrically conductive and can dissipate the static electricity charge.

Example 14

Before curing, the rubber composition contains:
(1) natural rubber NR SVR-3L (100 phr),
(2) oxide fillers and modifiers: precipitated SiO$_2$ Z-155 (50 phr), titanium dioxide TiO$_2$ (4 phr),
(3) organic plasticizers and modifiers: naphthenic oil KN4010 (5 phr), bis-(triethoxysilylpropyl)tetrasulfide (5 phr), polyethylene glycol ester (3.5 phr), 2-mercaptobenzimidazole (1 phr),
(4) curing system: peroxide—Perkadox BC-40 (2 phr), stearic acid (2 phr), zinc oxide ZnO (4 phr).
(5) TUBALL™ single wall carbon nanotubes (0.19 phr).

Carbon allotropes other than carbon nanotubes are present as TUBALL™ impurities (0.01 phr). The transmission electronic micrographs of the single wall carbon nanotubes used are shown in FIG. 1. The rubber composition also contains 0.03 phr of metallic iron found in the TUBALL™ single wall carbon nanotubes as impurity.

The rubber composition was made by a two-stage mixing method: in the first stage, the rubbers were mixed with silicon oxide, TiO$_2$, organic plasticizers and modifiers, IPPD antioxidant, stearic acid, zinc oxide, and single wall carbon nanotubes in the internal rubber mixer with a temperature increase to 150° C., and in the second stage, the remaining components of the curing system were added to the internal rubber mixer with a temperature increase to 100° C.

Curing was performed on a curing press at 200 kgf/cm$^2$ and 180° C. for 20 minutes.

The electrical conductivity and surface electrical resistivity of the rubber composition after curing are summarized in Table 1. The data in the table indicate that the rubber composition from Example 14 is electrically conductive and can dissipate the static electricity charge.

Example 15

Before curing, the rubber composition contains:
(1) natural rubber NR SVR-3L (100 phr),
(2) oxide fillers and modifiers: precipitated SiO$_2$ Z-155 (50 phr), titanium dioxide TiO$_2$ (4 phr),
(3) organic plasticizers and modifiers: naphthenic oil KN4010 (5 phr), bis-(triethoxysilylpropyl)tetrasulfide (TESPT, Si-69) (5 phr), polyethylene glycol ester (3.5 parts), N-isopropyl-N-phenyl-p-phenylene diamine (IPPD) (0.5 phr),
(4) curing system: peroxide—Perkadox BC-40 (2 phr), stearic acid (2 phr), zinc oxide ZnO (4 phr),
(5) TUBALL™ single wall carbon nanotubes (0.19 phr), multi-wall carbon nanotubes (0.2 phr).

Carbon allotropes other than carbon nanotubes are present as TUBALL™ impurities (0.01 phr). The transmission electronic micrographs of the single wall carbon nanotubes used are shown in FIG. 1. The rubber composition also contains 0.03 phr of metallic iron found in the TUBALL™ single wall carbon nanotubes as impurity.

The rubber composition was made by a two-stage mixing method: in the first stage, the rubber was mixed with silicon oxide, TiO$_2$, organic plasticizers and modifiers, IPPD antioxidant, stearic acid, zinc oxide, as well as single wall and multi-wall carbon nanotubes in the internal rubber mixer with a temperature increase to 150° C., and in the second stage, the remaining components of the curing system were added to the internal rubber mixer at a temperature up to 100° C.

Curing was performed on a curing press at 200 kgf/cm$^2$ and 180° C. for 20 minutes.

The electrical conductivity and surface electrical resistivity of the rubber composition after curing are summarized in Table 1. The data in the table indicate that the rubber composition from Example 15 is electrically conductive and can dissipate the static electricity charge.

Example 16

A rubber composition similar to Example 15, although with the single wall and multi-wall carbon nanotubes added to the rubber mixture at the second mixing stage in the internal rubber mixer. The electrical conductivity and surface electrical resistivity of the rubber composition after curing are summarized in Table 1. The data in the table indicate that the rubber composition from Example 16 is electrically conductive and can dissipate the static electricity charge.

Example 17

Before curing, the rubber composition contains:
(1) mixture of natural rubber NR SVR-3L (80 phr) and butadiene rubber BR9000 (20 phr),
(2) oxide fillers and modifiers: precipitated SiO$_2$ Z-155 (50 phr), TiO$_2$ (10 phr),
(3) organic plasticizers and modifiers: naphthenic oil KN4010 (5 phr), bis-(triethoxysilylpropyl)tetrasulfide (TESPT, Si-69) (5 phr), polyethylene glycol ester (3.5 phr), blue phthalocyanine dye (2 phr), (4) curing system: sulfur (1 phr), stearic acid (2 phr), ZnO (5 phr), tetrabenzylthiuram disulfide (TBzTD) (0.5 phr), sulfenamide C (N-cyclohexyl-2-benzothiazolylsulfenamide, CBS) (2 phr), (5) TUBALL™ single wall carbon nanotubes 0.28 phr.

Carbon allotropes other than carbon nanotubes are present as TUBALL™ impurities (0.016 phr). The transmission electronic micrographs of the single wall carbon nanotubes used are shown in FIG. 1. Therefore, the total amount of carbon allotropes is 0.3 phr. The rubber composition also contains 0.05 phr of metallic iron found in the TUBALL™ single wall carbon nanotubes as impurity.

The rubber composition was made by a two-stage mixing method: in the first stage, the rubbers were mixed with silicon oxide and organic plasticizers and modifiers, as well as stearic acid and zinc oxide in the internal rubber mixer with a temperature increase to 140° C., and in the second stage, the remaining components of the curing system, titanium oxide, phthalocyanine dye and single wall carbon nanotubes were added using two roll rubber mill (two-roller mill) with a gap of 2-3 mm until the curing system and color modifying components were completely mixed.

The electrical conductivity and surface electrical resistivity of the rubber composition after curing are summarized in Table 1. The data in the table indicate that the rubber composition from Example 17 is electrically conductive and can dissipate the static electricity charge.

Example 18

Before curing, the rubber composition contains:

(1) mixture of natural rubber NR-CV60 (80 phr) and butadiene rubber BR9000 (20 phr), (2) oxide fillers and modifiers: precipitated $SiO_2$ Z-155 (60 phr), organic plasticizers and modifiers: naphthenic oil KN4010 (5 phr), bis-(triethoxysilylpropyl) tetrasulfide (TESPT, Si-69) (5 phr), polyethylene glycol ester (3.5 phr), (3) curing system: sulfur (1 phr), stearic acid (2 phr), ZnO (5 phr), tetrabenzylthiuram disulfide (TBzTD) (0.5 phr), sulfenamide C (N-cyclohexyl-2-benzothiazolylsulfenamide, CBS) (2 phr), (4) TUBALL™ single wall carbon nanotubes (1.43 phr).

Carbon allotropes other than carbon nanotubes are present as TUBALL™ impurities (0.07 phr). The transmission electronic micrographs of the single wall carbon nanotubes used are shown in FIG. 1. The rubber composition also contains 0.24 phr of metallic iron found in the TUBALL™ single wall carbon nanotubes as impurity.

The rubber composition was made by a two-stage mixing method: in the first stage, the rubbers were mixed with silicon oxide, organic plasticizers and modifiers, stearic acid, zinc oxide, as well as single wall carbon nanotubes in the internal rubber mixer with a temperature increase to 140° C., and in the second stage, the remaining components of the curing system were added to the internal rubber mixer with a temperature increase to 90° C.

The curing was performed on a curing press at 200 kgf/cm² and 170° C. for 8 minutes.

The electrical conductivity and surface electrical resistivity of the rubber composition after curing are summarized in Table 1. The data in the table indicate that the rubber composition from Example 18 is electrically conductive and can dissipate the static electricity charge.

Example 19

A rubber composition similar to Example 18, although with the carbon nanotubes was added to the rubber mixture at the second mixing stage in the internal rubber mixer. The data on electrical conductivity and surface electrical resistivity of the rubber composition before and after curing are summarized in Table 1. The data in the table indicate that the rubber composition from Example 19 is electrically conductive and can dissipate the static electricity charge.

Example 20

Before curing, the rubber composition contains:

(1) natural rubber NR SVR-3L (100 phr), (2) oxide fillers and modifiers: precipitated $SiO_2$ Z-155 (50 phr), Titanium dioxide $TiO_2$ (4 phr), (3) organic plasticizers and modifiers: naphthenic oil KN4010 (5 phr), bis-(triethoxysilylpropyl)tetrasulfide (TESPT, Si-69) (5 phr), polyethylene glycol ester (3.5 phr), N-isopropyl-N-phenyl-p-phenylene diamine (IPPD) (0.5 phr), (4) curing system: peroxide—Perkadox BC-40 (2 phr), stearic acid (2 phr), zinc oxide ZnO (4 phr), (5) purified TUBALL™ 99 single wall carbon nanotubes (0.19 phr).

The transmission electronic micrographs of the purified TUBALL™ 99 single wall carbon nanotubes wall carbon nanotubes used are shown in FIG. 6. The rubber composition was made by a one-stage mixing method on the two roll rubber mill with a gap between the rolls of 3 mm. The total mixing time was 30 minutes. The rubber was heated on the rolls for 10 minutes, followed by loading the components of the curing system, silicon oxide, $TiO_2$, organic plasticizers and modifiers, IPPD antioxidant, stearic acid, zinc oxide and purified single wall carbon nanotubes at a roll temperature 80° C.

Curing was performed on a curing press at 200 kgf/cm² and 180° C. for 20 minutes.

The data on electrical conductivity and surface electrical resistivity of the rubber composition before and after curing are summarized in Table 1. The data in the table indicate that the rubber composition from Example 20 is electrically conductive and can dissipate the static electricity charge.

Example 21

A solid tire 4.5" wide, 8" seat diameter, 373 mm outer diameter was made from the rubber composition of claim 17. The tire resistance measured in accordance with ISO 16392 was $3.10^6$ Ohm. The tire cut surface resistance measured in accordance with EN 60079-0 was $240^7$ Ohm. The tire meets the electrical conductivity requirements and leaves no marks during operation.

Example 22

A solid tire 25 mm wide, 100 mm seat diameter, 150 mm outer diameter was made from the rubber composition of claim 14. The tire resistance measured by the 4-point method was $3.10^5$ Ohm. The tire resistance measured in accordance with ISO 16392 was $3.10^7$ Ohm. The tire meets the electrical conductivity requirements and leaves no marks during operation.

TABLE 1

Data on electrical conductivity and surface electrical resistivity of rubber composition after curing

| Example | CNT content, phr | Total content of carbon allotropes, phr | Surface electrical resistivity after curing, Ohm/sq | Specific volume conductivity after curing, S/m |
|---|---|---|---|---|
| 1 | 0.38 | 0.4 | $3.2 \times 10^5$ | $3.3 \times 10^{-1}$ |
| 2 | 0.05 | 0.95 | $7.4 \times 10^9$ | $3.3 \times 10^{-6}$ |
| 3 | 0.24 | 0.50 | $2.8 \times 10^8$ | $2.5 \times 10^{-4}$ |
| 4 | 0.38 | 0.4 | $7.6 \times 10^6$ | $1.3 \times 10^{-2}$ |
| 5 | 0.76 | 0.8 | $5.9 \times 10^4$ | $5 \times 10^{-1}$ |
| 6 | 0.38 | 0.4 | $3.1 \times 10^7$ | $1.6 \times 10^{-2}$ |
| 7 | 0.38 | 0.4 | $1.8 \times 10^7$ | $3.3 \times 10^{-3}$ |
| 8 | 0.38 | 0.4 | $8.3 \times 10^5$ | $2.0 \times 10^{-2}$ |
| 9 | 0.38 | 0.38 | $3.7 \times 10^7$ | $2.5 \times 10^{-3}$ |
| 10 | 1.43 | 1.5 | $4.6 \times 10^3$ | 3.3 |
| 11 | 0.39 | 1.4 | $3.9 \times 10^4$ | $3.3 \times 10^{-1}$ |
| 12 | 0.39 | 0.9 | $4.4 \times 10^4$ | $2.5 \times 10^{-1}$ |
| 13 | 0.39 | 0.7 | $7.5 \times 10^5$ | $1.3 \times 10^{-2}$ |
| 14 | 0.19 | 0.2 | $3.9 \times 10^8$ | $2.0 \times 10^{-4}$ |
| 15 | 0.39 | 0.4 | $1.4 \times 10^7$ | $3.3 \times 10^{-4}$ |
| 16 | 0.39 | 0.4 | $8.9 \times 10^7$ | $1.4 \times 10^{-3}$ |
| 17 | 0.28 | 0.3 | $3.1 \times 10^6$ | $1.0 \times 10^{-3}$ |
| 18 | 1.43 | 1.5 | $1.3 \times 10^4$ | 5 |
| 19 | 1.43 | 1.5 | $8.4 \times 10^5$ | 1.4 |
| 20 | 0.19 | 0.2 | $8.1 \times 10^8$ | $2.5 \times 10^{-4}$ |

INDUSTRIAL APPLICABILITY

The present invention can be used in various industries that require electrically conductive rubber compositions and non-marking solid tires made from these rubber compositions.

The non-marking solid tires are especially relevant in the areas facing high sanitary and hygienic requirements, especially in the warehouses and industrial areas of food factories or in public places, such as airports and railway stations.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention.

What is claimed is:

1. An electrically conductive rubber composition for non-marking solid tires comprising:
   (1) a rubber or a mixture of at least two rubbers;
   (2) oxide fillers and modifiers;
   (3) organic plasticizers and modifiers;
   (4) a curing system; and
   (5) carbon nanotubes,
   wherein a total amount of carbon nanotubes and other carbon allotropes in the rubber composition ranges from 0.05 to 1.5 wt. % of a rubber content.

2. The rubber composition of claim 1, wherein an amount of carbon nanotubes ranges from 0.05 to 1 wt. % of the rubber content.

3. The rubber composition of claim 2, wherein the amount of carbon nanotubes ranges from 0.05 to 0.5 wt. % of the rubber content.

4. The rubber composition of claim 1, wherein the total amount of carbon allotropes in the rubber composition ranges from 0.05 to 1 wt. % of the rubber content.

5. The rubber composition of claim 1, wherein the composition includes single wall and/or double wall carbon nanotubes.

6. The rubber composition of claim 5, wherein the composition includes single wall carbon nanotubes.

7. The rubber composition of claim 1, wherein the oxide fillers and modifiers include silicon oxide.

8. The rubber composition of claim 1, wherein the oxide fillers and modifiers include titanium oxide.

9. The rubber composition of claim 1, wherein the organic plasticizers and modifiers include one or more organic dyes.

10. The rubber composition of claim 1, wherein a specific volume conductivity of the composition after curing is $10^{-3}$ S/m or more.

11. The rubber composition of claim 1, wherein the rubber or a mixture of at least two rubbers is 100 wt. parts of the composition, wherein the rubber is a natural rubber and the two rubbers include a synthetic rubber, 50 to 70 wt. parts of silicon oxide, 5 to 10 wt. parts of titanium oxide, 5 to 7 wt. parts of bis-(triethoxysilylpropyl) tetrasulfide, 3 to 10 wt. parts of petroleum oil, 3 to 5 wt. parts of zinc oxide, 1 to 2 wt. parts of stearic acid, 1 to 3 wt. parts of sulfur, 0.5 to 4 wt. parts of curing accelerators, and 0.05 to 1.5 wt. parts of single wall carbon nanotubes.

12. The rubber composition of claim 1, wherein the rubber or a mixture of at least two rubbers is 100 wt. parts of the composition, wherein the rubber is a natural rubber and the two rubbers include a synthetic rubber, 50 to 70 wt. parts of silicon oxide, 5 to 15 wt. parts of titanium oxide, 5 to 7 wt. parts of bis-(triethoxysilylpropyl) tetrasulfide, 3 to 10 wt. parts of petroleum oil, 0.5 to 3 parts of organic dye, 3 to 5 wt. parts of zinc oxide, 1 to 2 wt. parts of stearic acid, 1 to 3 wt. parts of sulfur, 0.5 to 4 wt. parts of curing accelerators, and 0.05 to 1.5 wt. parts of single wall carbon nanotubes.

13. A non-marking solid tire made using the electrically conductive rubber composition of claim 1.

14. The non-marking solid tire of claim 13, wherein a tire tread of the tire is made using the electrically conductive rubber composition of claim 1.

15. An electrically conductive rubber composition for non-marking solid tires comprising:
(1) a rubber or a mixture of at least two rubbers;
(2) oxide fillers and modifiers;
(3) organic plasticizers and modifiers;
(4) a curing system; and
(5) carbon nanotubes,
wherein a total amount of carbon nanotubes and other carbon allotropes in the rubber composition ranges from 0.05 to 1.5 wt. % of a rubber content,
wherein a length/diameter ratio of the carbon nanotubes in the composition is at least 500.

16. The rubber composition of claim 15, wherein the length/diameter ratio of the carbon nanotubes in the composition is at least 1,000.

17. An electrically conductive rubber composition for non-marking solid tires comprising:
(1) a rubber or a mixture of at least two rubbers;
(2) oxide fillers and modifiers;
(3) organic plasticizers and modifiers;
(4) a curing system; and
(5) carbon nanotubes, wherein a total amount of carbon nanotubes and other carbon allotropes in the rubber composition ranges from 0.05 to 1.5 wt. % of a rubber content, wherein at least some of the carbon nanotubes in the composition are bundled.

18. The rubber composition of claim 17, wherein a thickness of at least a part of the carbon nanotube bundles in the composition is at least 300 nm.

19. An electrically conductive rubber composition for non-marking solid tires comprising:
(1) a rubber or a mixture of at least two rubbers;
(2) oxide fillers and modifiers;
(3) organic plasticizers and modifiers;
(4) a curing system; and
(5) carbon nanotubes,
wherein a total amount of carbon nanotubes and other carbon allotropes in the rubber composition ranges from 0.05 to 1.5 wt. % of a rubber content,
wherein the composition includes particles of one or more metals from groups 8-11 in the periodic table, or their alloys.

20. An electrically conductive rubber composition for non-marking solid tires comprising:
(1) a rubber or a mixture of at least two rubbers;
(2) oxide fillers and modifiers;
(3) organic plasticizers and modifiers;
(4) a curing system; and
(5) carbon nanotubes,
wherein a total amount of carbon nanotubes and other carbon allotropes in the rubber composition ranges from 0.05 to 1.5 wt. % of a rubber content,
wherein the oxide fillers and modifiers include one or more oxides with transition metals and having absorption bands in the visible range.

* * * * *